United States Patent
Yamasaki et al.

(10) Patent No.: US 10,448,262 B2
(45) Date of Patent: *Oct. 15, 2019

(54) COMMUNICATION SYSTEM, TRANSMISSION TERMINAL AND RECEPTION TERMINAL

(71) Applicant: Panasonic Intellectual Property Management Co., Ltd., Osaka (JP)

(72) Inventors: Akira Yamasaki, Osaka (JP); Nobuhiko Arashin, Osaka (JP); Takuji Maeda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/847,257

(22) Filed: Dec. 19, 2017

(65) Prior Publication Data

US 2018/0109963 A1    Apr. 19, 2018

Related U.S. Application Data

(63) Continuation of application No. PCT/JP2016/003008, filed on Jun. 22, 2016.

(30) Foreign Application Priority Data

Jul. 7, 2015 (JP) ................. 2015-135763

(51) Int. Cl.
*H04W 16/28* (2009.01)
*H04W 4/00* (2018.01)
*H04W 76/15* (2018.01)

(52) U.S. Cl.
CPC ............. *H04W 16/28* (2013.01); *H04W 4/00* (2013.01); *H04W 76/15* (2018.02)

(58) Field of Classification Search
CPC ........ H04W 4/00; H04W 76/15; H04W 16/28
See application file for complete search history.

(56) References Cited

U.S. PATENT DOCUMENTS

2007/0207838 A1* 9/2007 Kuwahara ............. H01Q 1/246
                                                                 455/562.1
2009/0168650 A1   7/2009 Kesselman
(Continued)

FOREIGN PATENT DOCUMENTS

JP    2009-48451    3/2009
JP    2010-117212   5/2010
(Continued)

OTHER PUBLICATIONS

International Search Report dated Sep. 6, 2016 in corresponding International Application No. PCT/JP2016/003008.

*Primary Examiner* — Brian D Nguyen
(74) *Attorney, Agent, or Firm* — Wenderoth, Lind & Ponack, L.L.P.

(57) ABSTRACT

A communication system includes a transmission terminal and a reception terminal, and the transmission terminal transmits data to the reception terminal. The transmission terminal includes a storage unit that stores data and management information of the data, and a first communication unit that performs communication using a first radio method having non-directivity and a second radio method having directivity. The reception terminal includes a second communication unit that performs communication using the first radio method having non-directivity and the second radio method having directivity, and a selector that selects the data based on the management information. The first communication unit and the second communication unit communicate with each other using the first radio method having non-directivity when selecting the data to be transmitted, and (Continued)

communicates with each other using the second radio method having directivity when transmitting the selected data.

9 Claims, 7 Drawing Sheets

(56) References Cited

U.S. PATENT DOCUMENTS

| | | | |
|---|---|---|---|
| 2010/0233966 A1* | 9/2010 | Kashiwase | H04B 7/005 |
| | | | 455/67.11 |
| 2011/0299464 A1* | 12/2011 | Kuwahara | H01Q 1/246 |
| | | | 370/328 |
| 2012/0230311 A1 | 9/2012 | Kessleman et al. | |
| 2014/0112326 A1 | 4/2014 | Torikai et al. | |
| 2015/0055526 A1 | 2/2015 | Shao et al. | |
| 2015/0110074 A1* | 4/2015 | Yamasaki | H04W 36/03 |
| | | | 370/331 |
| 2015/0163708 A1 | 6/2015 | Kurtugi et al. | |
| 2016/0135233 A1 | 5/2016 | Fujita | |
| 2016/0198455 A1* | 7/2016 | Caretti | H04B 17/318 |
| | | | 370/329 |
| 2017/0026960 A1* | 1/2017 | Mestanov | H04W 72/0426 |
| 2018/0049110 A1* | 2/2018 | Hasegawa | H04W 4/00 |

FOREIGN PATENT DOCUMENTS

| | | |
|---|---|---|
| JP | 2011-509022 | 3/2011 |
| JP | 2012-186674 | 9/2012 |
| JP | 2014-86844 | 5/2014 |
| JP | 2015-115713 | 6/2015 |
| WO | 2009/085527 | 7/2009 |
| WO | 2014/203657 | 12/2014 |

* cited by examiner

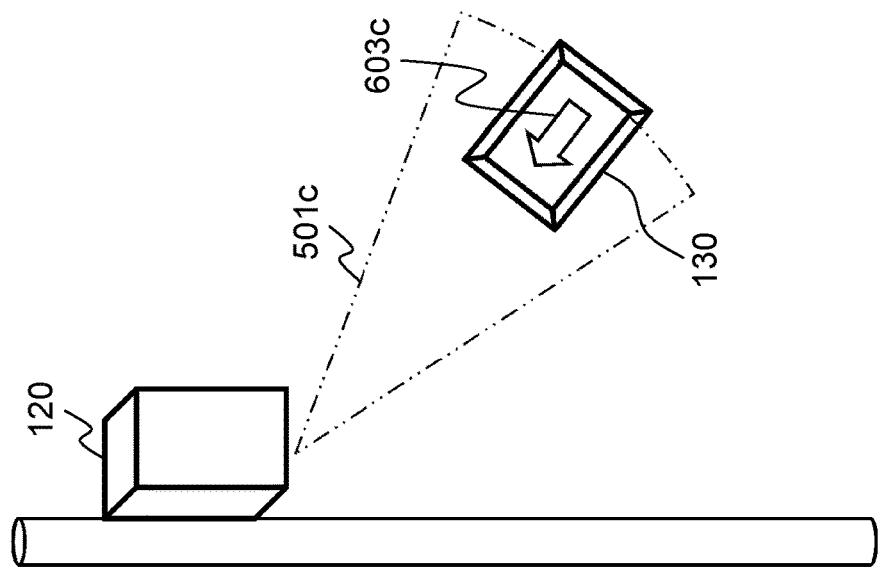
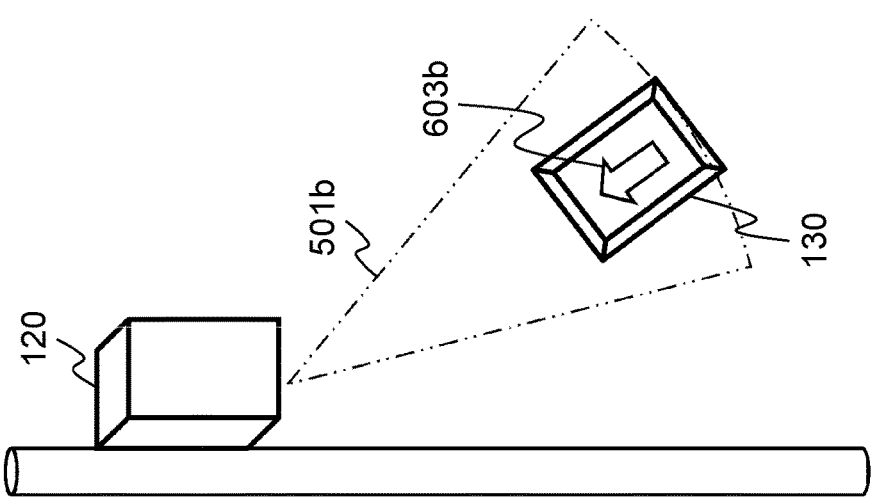
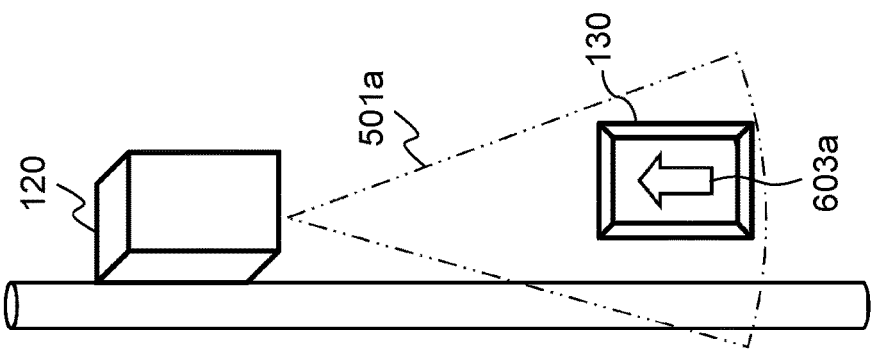

COMMUNICATION SYSTEM, TRANSMISSION TERMINAL AND RECEPTION TERMINAL

BACKGROUND

1. Technical Field

The present disclosure relates to a communication system in which only a specific terminal can perform reception, a transmission terminal, and a reception terminal.

2. Description of the Related Art

PTL 1 discloses a communication system that communicates with a wireless access system using different radio methods.

CITATION LIST

Patent Literature

PTL 1: Unexamined Japanese Patent Publication No. 2015-115713

SUMMARY

The present disclosure provides a communication system that maintains convenience for a user and simultaneously suppresses interception of data by unauthorized users, a transmission terminal, and a reception terminal.

The communication system of the present disclosure includes a transmission terminal and a reception terminal. The transmission terminal transmits data to the reception terminal. The transmission terminal includes a storage unit that stores data and management information of the data, and a first communication unit that performs communication using a first radio method having non-directivity and a second radio method having directivity. The reception terminal includes a second communication unit that performs communication using the first radio method having non-directivity and the second radio method having directivity, and a selector that selects the data based on the management information. The first communication unit and the second communication unit communicate with each other using the first radio method having non-directivity when selecting the data to be transmitted, and communicate with each other using the second radio method having directivity when transmitting the selected data.

Further, the transmission terminal of the present disclosure transmits data to the reception terminal. The transmission terminal includes a storage unit that stores data and management information of the data, and a communication unit that performs communication using the first radio method having non-directivity and the second radio method having directivity. The communication unit performs communication using the first radio method having non-directivity when selecting the data to be transmitted, and performs communication using the second radio method having directivity when transmitting the selected data.

Further, the reception terminal of the present disclosure receives data from the transmission terminal. The reception terminal includes a communication unit that performs communication using the first radio method having non-directivity and the second radio method having directivity, and a selector that acquires management information of the transmission terminal and selects data based on the management information. The communication unit performs communication using the first radio method having non-directivity when selecting data to be received and performs communication using the second radio method having directivity when receiving the selected data.

BRIEF DESCRIPTION OF THE DRAWINGS

FIG. 7A is a diagram illustrating a notification example of the reception terminal based on directivity of the transmission terminal according to the exemplary embodiment;

FIG. 7B is a diagram illustrating a notification example of the reception terminal based on directivity of the transmission terminal according to the exemplary embodiment; and FIG. 7C is a diagram illustrating a notification example of the reception terminal based on directivity of the transmission terminal according to the exemplary embodiment.

DETAILED DESCRIPTION

Hereinafter, exemplary embodiments will be described in detail with reference to the drawings as appropriate. However, in some cases, detailed description more than necessary may be omitted. For example, in some cases, detailed description of well-known matters or repeated description of substantially the same configuration may be omitted. This is to avoid the following description from being unnecessarily redundant, and to facilitate understanding of those skilled in the art.

Note that the attached drawings and the following description are provided for those skilled in the art to fully understand the present disclosure, and are not intended to limit the subject matter as described in the appended claims.

First Exemplary Embodiment

A first exemplary embodiment will be described below with reference to FIGS. 1 to 7C.

1-1. Configuration

Figure 1:
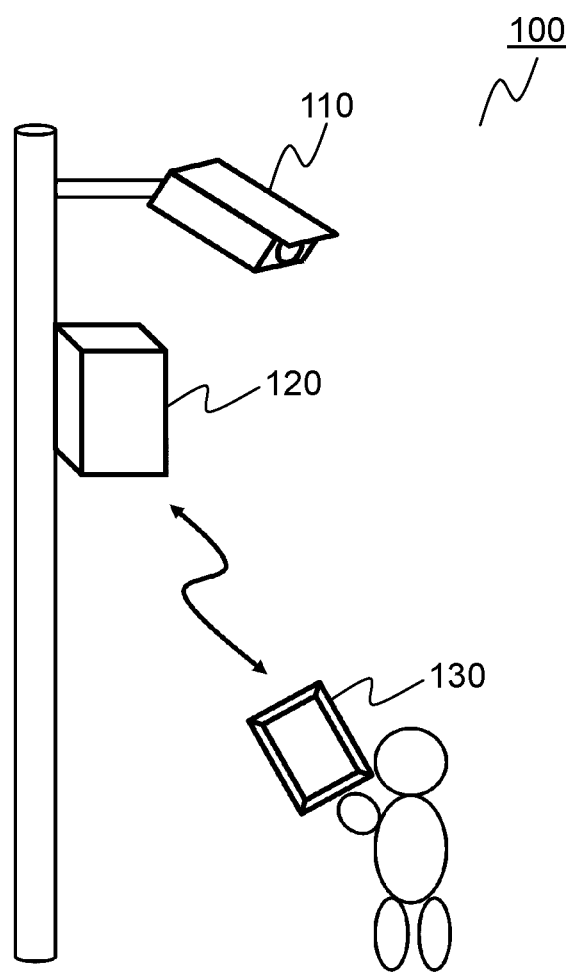
FIG. 1 is a configuration diagram illustrating a communication system according to an exemplary embodiment.

A communication system according to the exemplary embodiment will be described with reference to FIG. 1. FIG. 1 is a configuration diagram of the communication system according to the exemplary embodiment.

In FIG. 1, communication system 100 includes transmission terminal 120 and reception terminal 130. Monitoring camera 110 and transmission terminal 120 are disposed on streets by using poles or the like. Further, monitoring camera 110 is also included in the communication system.

Monitoring camera 110 transmits captured image (video) data to transmission terminal 120 via a local area network (LAN) cable.

Transmission terminal 120 records the image transmitted from monitoring camera 110, and feeds power to monitoring camera 110 via the LAN cable. Further, transmission terminal 120 wirelessly communicates with reception terminal 130, and transmits, for example, the recorded image of monitoring camera 110.

Reception terminal 130 is a terminal having a radio communication function, such as a personal computer (a PC), a tablet, or a smartphone. A user performs an operation on reception terminal 130 to download the image of monitoring camera 110 saved in transmission terminal 120.

The image of monitoring camera 110 is an image captured in a store or in a street, and such a captured image has a privacy problem or the like. Therefore, in consideration of security, monitoring camera 110 and transmission terminal 120 that save image data are mounted out of reach of ordinary people so as not to be broken by passersby or such that the image data of monitoring camera 110 is not stolen.

Figure 2:
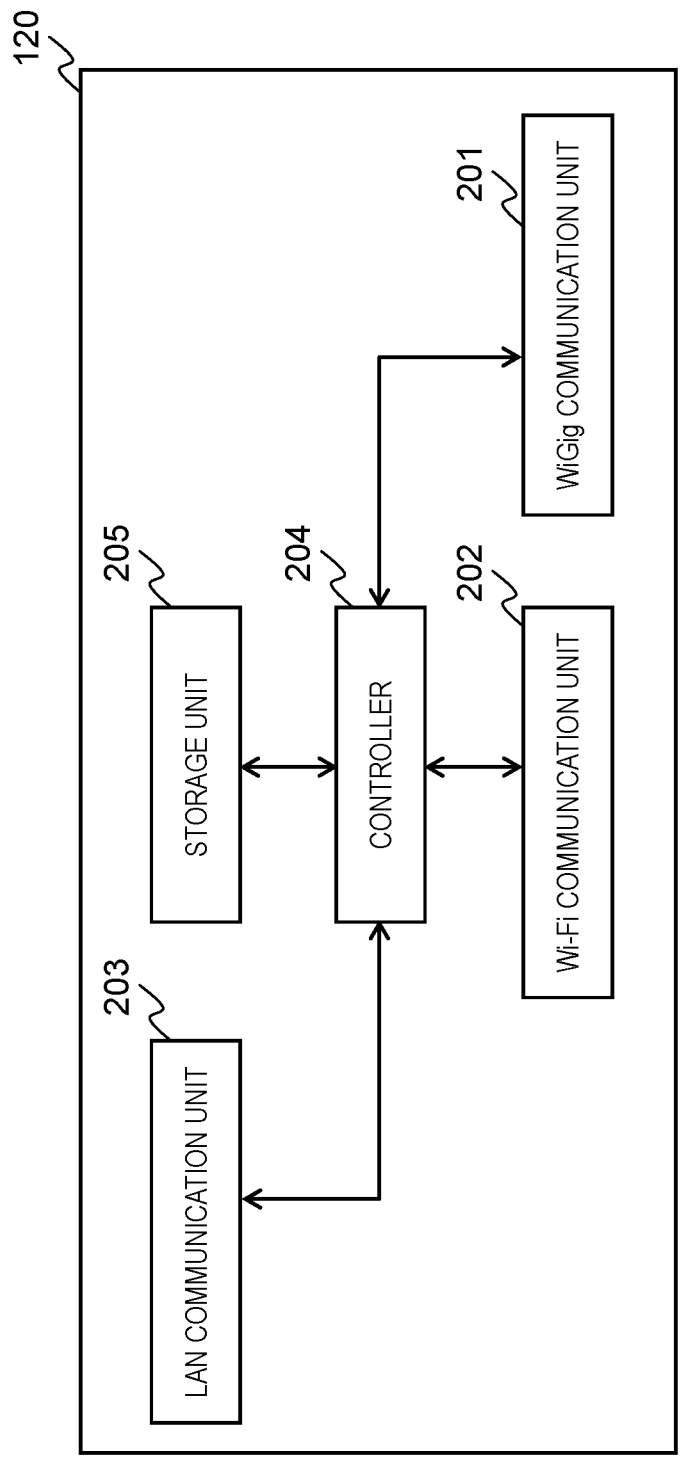
FIG. 2 is a configuration diagram of a transmission terminal according to the exemplary embodiment.

A specific configuration of transmission terminal 120 will be described below with reference to FIG. 2. FIG. 2 is a configuration diagram of the transmission terminal according to the exemplary embodiment.

In FIG. 2, transmission terminal 120 includes wireless gigabit (WiGig) communication unit 201, wireless fidelity (Wi-Fi) communication unit 202, LAN communication unit 203, controller 204, and storage unit 205.

WiGig communication unit 201 transmits and receives a WiGig packet. WiGig communication unit 201 is formed by an antenna that transmits and receives a radio signal, and a radio signal control circuit, for example.

Wi-Fi communication unit 202 transmits and receives a Wi-Fi packet. Wi-Fi communication unit 202 is formed by an antenna that transmits and receives a radio signal, and a radio signal control circuit, for example. Elements that are commonly used with WiGig communication unit 201 may be shared.

Herein, two radio communication methods, namely, a WiGig method and a Wi-Fi method to be used in the exemplary embodiment will be described in detail. The WiGig method using a radio of 60 GHz has a rectilinear-advancing property and directivity because of a high frequency. Further, transmittance through a shielding material such as a wall or a window is prevented, and attenuation easily occurs. Therefore, a communication distance is only about 10 m. The WiGig method corresponds to a second radio method of the present disclosure.

On the contrary, the Wi-Fi method using a radio of 2.4 GHz and 5 GHz is lower than the WiGig method in a frequency, and is a radio method without directivity (having non-directivity). Further, transmittance through a shielding material such as a wall or a window is allowed, and a communication distance is longer than the WiGig method. The Wi-Fi method corresponds to a first radio method of the present disclosure.

LAN communication unit 203 receives image data of monitoring camera 110 as a LAN packet. LAN communication unit 203 includes a LAN interface unit and a LAN signal control circuit, for example.

Controller 204 controls WiGig communication unit 201, Wi-Fi communication unit 202, LAN communication unit 203, and storage unit 205. Specifically, image data of the monitoring camera received by LAN communication unit 203 is stored in storage unit 205.

Further, Wi-Fi communication unit 202 receives a request for management information from reception terminal 130, and transmits the requested management information to reception terminal 130.

The management information means a list of image data of monitoring camera 110 stored in transmission terminal 120, and specifically, list information such as a camera identification (ID) (a camera name) and a date and time. The list information may include a thumbnail image.

Further, Wi-Fi communication unit 202 receives selected information requested by reception terminal 130, and WiGig communication unit 201 transmits the image data of monitoring camera 110 stored in storage unit 205. Controller 204 includes an arithmetic unit, software that is executed in the arithmetic unit, and the like.

The selected information means information selected from the list information on reception terminal 130. One piece of data (one item) may be selected, or a plurality of pieces of data or all data may be selected from the list information.

Storage unit 205 saves the image data received from monitoring camera 110, which is received through LAN communication unit 203. Storage unit 205 is formed by a storage device such as a read-only memory (a ROM), a random-access memory (a RAM), and a NOT-AND (a NAND) flash memory.

Figure 3:
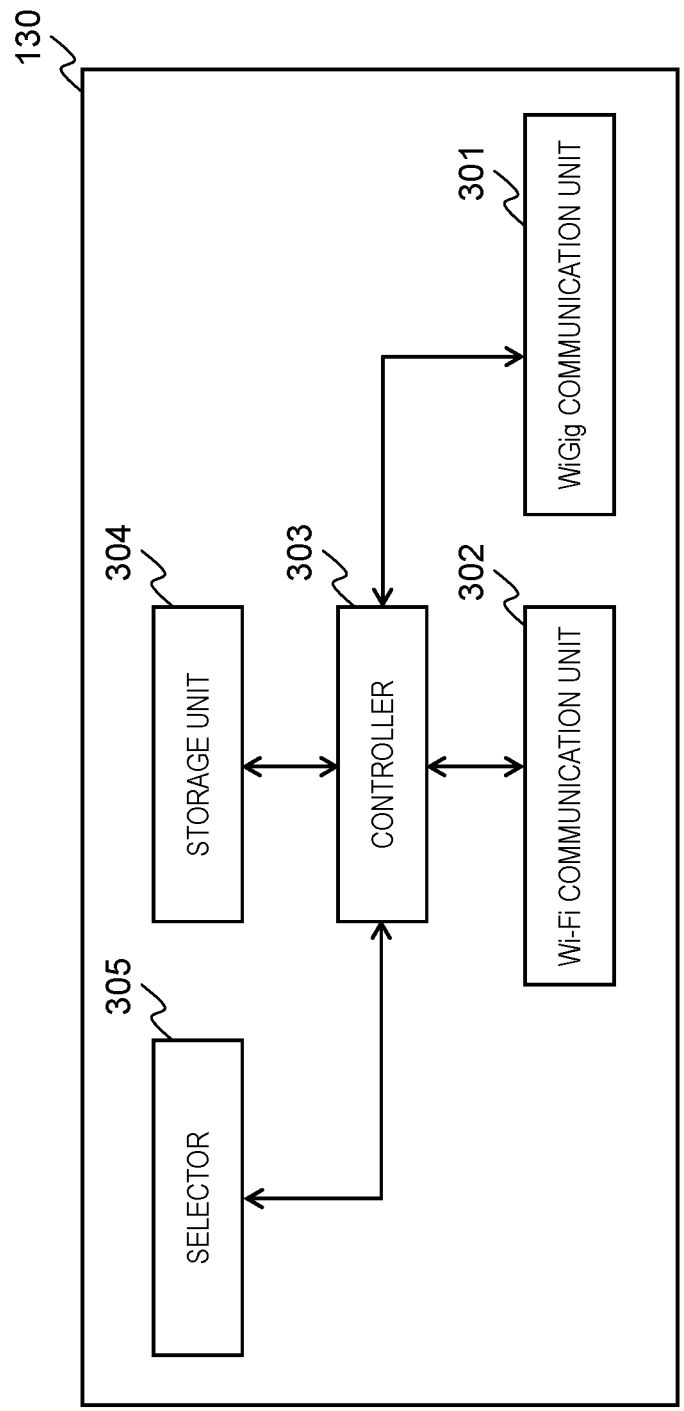
FIG. 3 is a configuration diagram of a reception terminal according to the exemplary embodiment.

A specific configuration of reception terminal 130 will be described below with reference to FIG. 3. FIG. 3 is a configuration diagram of the reception terminal according to the exemplary embodiment.

In FIG. 3, reception terminal 130 includes WiGig communication unit 301, Wi-Fi communication unit 302, controller 303, storage unit 304, and selector 305. Since WiGig communication unit 301 and Wi-Fi communication unit 302 have the identical configuration to transmission terminal 120, description thereof is omitted.

Controller 303 controls WiGig communication unit 301, Wi-Fi communication unit 302, storage unit 304, and selector 305. Specifically, Wi-Fi communication unit 302 transmits a request for management information to acquire the management information of transmission terminal 120, and receives the management information of transmission terminal 120 in response to the request for the management information. Wi-Fi communication unit 302 transmits data selected from the management information by a user, and stores the image data of monitoring camera 110 received by WiGig communication unit 301 into storage unit 304.

Storage unit 304 saves the image data of monitoring camera 110 received from WiGig communication unit 301. Storage unit 304 is formed by a storage device such as a ROM, a RAM, or a NAND flash memory.

Selector 305 presents information based on the management information received from controller 303 such that the user can select the information, and returns the information selected by the user to controller 303. For example, when the selector is a touch panel, a list with checkboxes is displayed based on the management information, and the user ticks a box. As a result, the ticked data is returned to controller 303. It is effective that a thumbnail image is also displayed when the management information has the thumbnail image.

1-2. Operation

Figure 4:
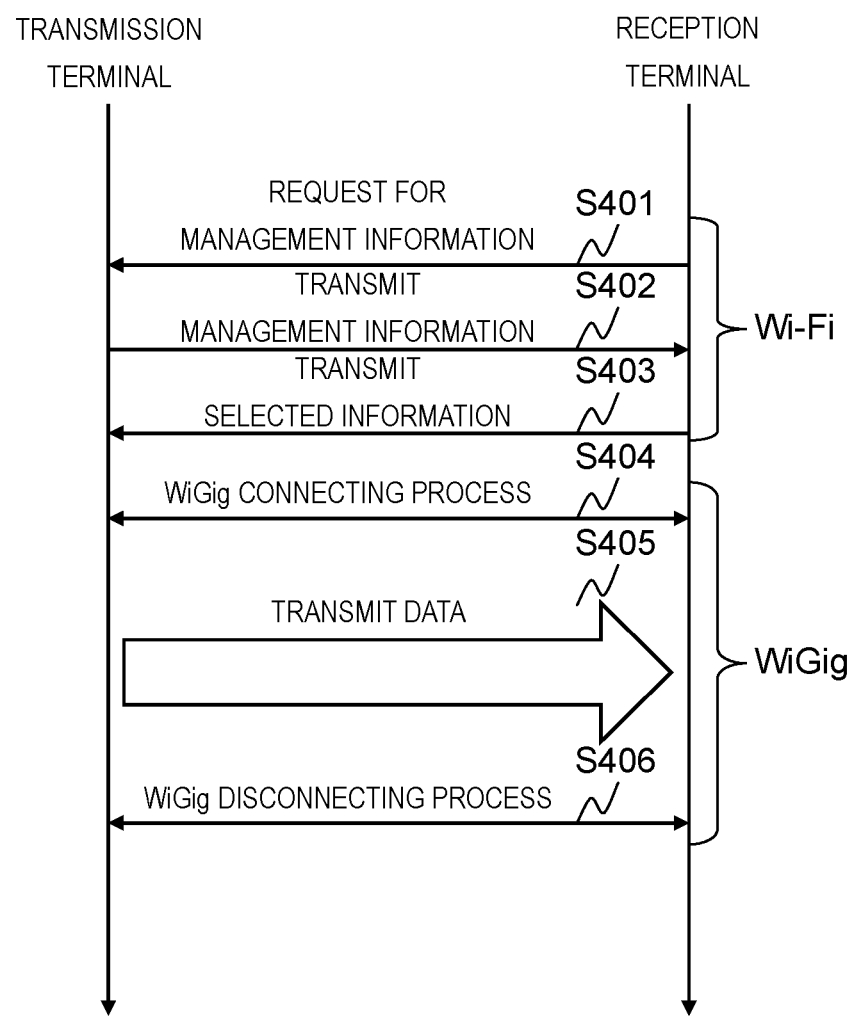
FIG. 4 is a sequence diagram of the communication system according to the exemplary embodiment.
Figure 5:
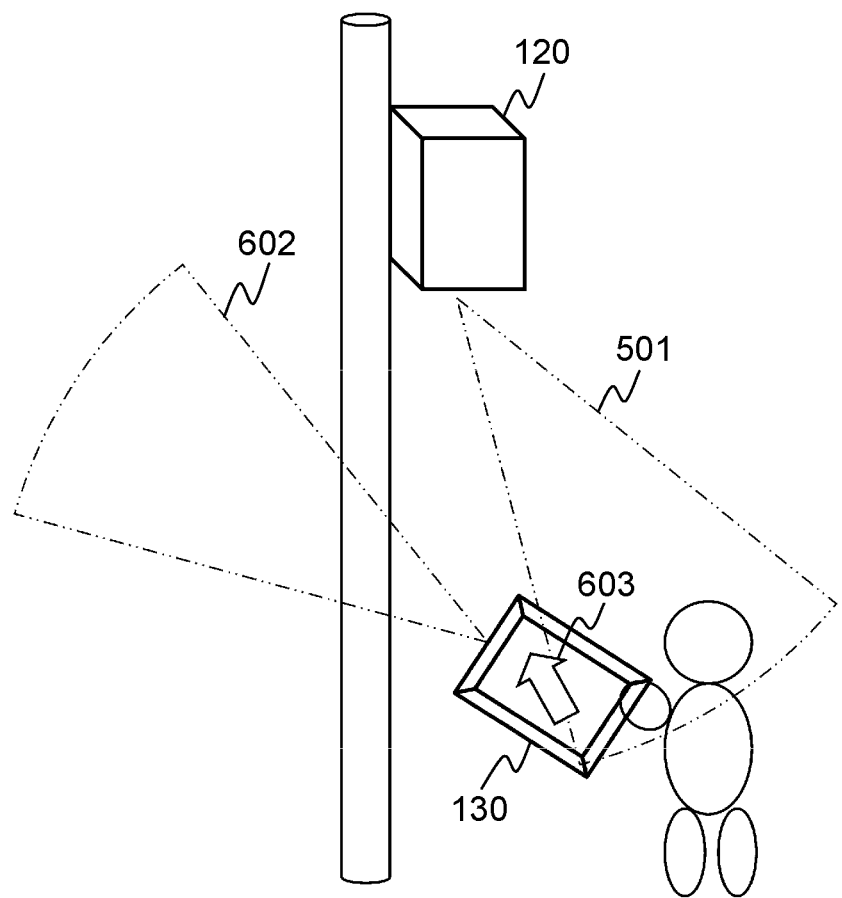
FIG. 5 is a diagram illustrating a notification example of the reception terminal according to the exemplary embodiment.

An operation of the communication system having the above configuration will be described below with reference to FIGS. 4 and 5. FIG. 4 is a sequence diagram of the communication system according to the exemplary embodiment, and FIG. 5 is a diagram illustrating a notification example of the reception terminal according to the exemplary embodiment. Transmission terminal 120 and reception terminal 130 are supposed to establish Wi-Fi connection with each other in advance herein.

First, when the user activates an application or a browser on reception terminal 130 in order to acquire an image of monitoring camera 110, reception terminal 130 requests management information of data retained in storage unit 205 of transmission terminal 120 from transmission terminal 120 using Wi-Fi (S401). For example, a hypertext transfer protocol (HTTP) or the like is used as a communication protocol of transmission terminal 120 and reception terminal 130.

When transmission terminal 120 receives the request for management information from reception terminal 130, transmission terminal 120 transmits management information created based on the data in storage unit 205 to reception terminal 130 using Wi-Fi (S402).

When reception terminal 130 receives the management information, reception terminal 130 displays a list selectable by the user on selector 305 based on the management information, and transmits the selected information of data selected from the list by the user to transmission terminal 120 using Wi-Fi (S403).

Transmission terminal 120 and reception terminal 130 execute a WiGig connecting process (S404). Specifically, after transmitting the selected information, reception terminal 130 notifies (displays) the user of an arrow icon illustrated in FIG. 5.

Since communication cannot be performed through WiGig having directivity when reception terminal 130 is not turned to a predetermined direction, arrow 603 illustrated in FIG. 5 is notified to the user. When the user changes a direction of reception terminal 130 according to arrow 603, communication range 501 of transmission terminal 120 overlaps with communication range 602 of reception terminal 130, and thus communication through WiGig is enabled.

In the exemplary embodiment, transmission terminal 120 communicates with only one reception terminal 130 through WiGig in order to ensure security. That is, transmission terminal 120 does not simultaneously communicate with a plurality of reception terminals 130 through WiGig, and they communicate only on a one-to-one basis.

For this reason, when another reception terminal 130 is connected to transmission terminal 120 through WiGig, an incommunicable state is notified by using Wi-Fi.

Further, also when WiGig connection is disabled due to a reason such as the incommunicable state, similarly the disabled state is notified by using Wi-Fi.

When the WiGig connecting process is completed, transmission terminal 120 transmits the image data of monitoring camera 110 selected by the user based on the selected information acquired in step S403 to reception terminal 130 using WiGig. Reception terminal 130 receives the image data (S405).

When the transmission of the image data using WiGig is completed, the WiGig connection between transmission terminal 120 and reception terminal 130 is disconnected, and transmission terminal 120 notifies reception terminal 130 of completion of image data reception through Wi-Fi (S406).

Figure 6:
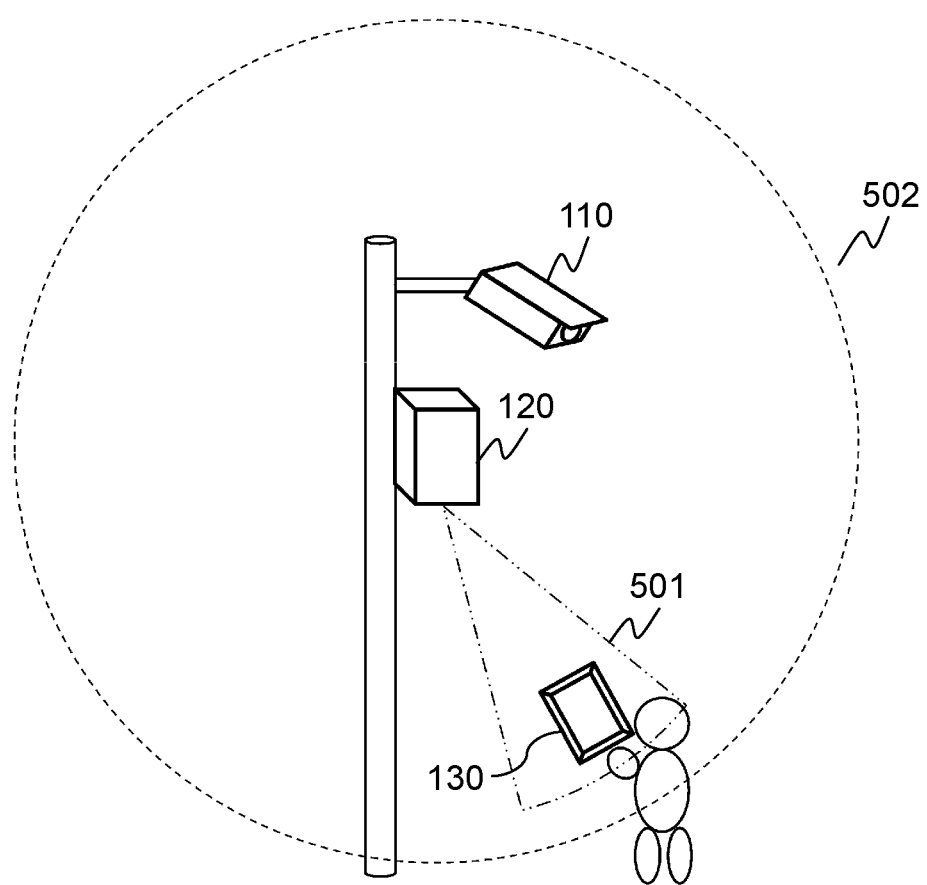
FIG. 6 is a communication range comparison diagram according to the exemplary embodiment.

A reason why the communication system that operates as described above exchanges control information, namely, management information and selected information through Wi-Fi, and exchanges image data through WiGig will be described with reference to FIG. 6. FIG. 6 is a communication range comparison diagram according to the exemplary embodiment.

Since the image of monitoring camera 110 is data which has a privacy problem as described above, image data is necessarily prevented from being stolen by unspecified users.

At this time, an example of a security ensuring method is a password, but such a password might be intercepted and deciphered to be illegally acquired. For this reason, in the exemplary embodiment, physical security is ensured such that only a specific user can receive data.

That is, as illustrated in FIG. 6, WiGig communication range 501, namely, radio having directivity of narrow communication range is used to enable only users in a specific direction to receive data. In such a manner, users who can receive data are limited.

However, when communication is performed by using radio having directivity such as WiGig, the user has to operate the touch panel without seeing it in a specific direction, and thus a user operation might be inconvenient.

For this reason, Wi-Fi communication range 502 illustrated in FIG. 6, namely, radio having non-directivity is used to enable the user to perform an operation without regard to a specific direction.

In the exemplary embodiment, since transmission terminal 120 is disposed at a high place 4 m or more in height, for example (a position sufficiently higher than a user's height), the range of the radio having directivity is a downward direction. Therefore, a communication range of a user under transmission terminal 120 is further limited, and thus unspecified users can be prevented from illegally acquiring data.

Further, when transmission terminal 120 is at a high place, an absolute value of an angle formed between a center line of WiGig communication range 501 and a line in a direction of gravitational force is preferably 45° or less.

Further, since the radio such as WiGig with a high frequency cannot transmit through a shielding material such as a wall or a window as described above, even if transmission terminal 120 is disposed against a wall in doors, interception from outdoors can be prevented.

The above has described an example where an arrow is displayed such that WiGig communication is securely performed, and a detailed example will be described with reference to FIG. 7A to FIG. 7C. FIG. 7A to FIG. 7C are diagrams illustrating notification examples of the reception terminal based on directivity of the transmission terminal according to the exemplary embodiment.

As illustrated in FIG. 7A to FIG. 7C, the communication range of transmission terminal 120 is occasionally in various directions like WiGig communication ranges 501a to 501c depending on disposition of an internal substrate or an installation condition. Assuming such a case, transmission terminal 120 stores a communication range (installation information) in storage unit 205 in advance at an installation time, and transmits the installation information to reception terminal 130 through Wi-Fi before WiGig connection. When reception terminal 130 receives the installation information, transmission terminal 120 can perform notification like arrows 603a to 603c according to the respective communication ranges, and the user, namely, reception terminal 130 can be guided into WiGig communication ranges 501a to 501c.

1-3. Effects and Other Benefits

According to the exemplary embodiment, convenience for user is maintained and simultaneously interception of data by unauthorized users can be suppressed.

That is, communication of control information is performed by Wi-Fi with a wide communication range, and data transmission is performed by WiGig with strong directivity and a narrow communication range. As a result, the convenience for user is maintained and simultaneously security can be ensured when image data is transmitted.

Further, use of WiGig enables large-volume data of monitoring camera 110 or the like to be transmitted for a short time.

Other Exemplary Embodiments

As described above, the exemplary embodiment has been described as an example of the technique disclosed in the present application. However, the technique in the present disclosure is not limited thereto, and can also be applied to embodiments in which change, substitution, addition, omission and the like are performed. Respective constituent elements described in the above exemplary embodiment may be combined to present a new exemplary embodiment.

Accordingly, other exemplary embodiments will be described below.

In the above exemplary embodiment, monitoring camera 110 and transmission terminal 120 are separately formed, but may be integrally formed.

The above exemplary embodiment has described the case of installation on a pole. However, any disposition may be carried out such that monitoring camera 110 is disposed on a ceiling, transmission terminal 120 is disposed in the ceiling, and only WiGig communication unit 201 is disposed near monitoring camera 110. Further, a plurality of monitoring cameras 110 may be connected to transmission terminal 120.

Further, in the above exemplary embodiment, in transmission terminal 120, WiGig communication unit 201 and storage unit 205 may be independent from the other constituent elements, namely, two transmission terminals 120 may be disposed separately.

Further, in the above exemplary embodiment, in reception terminal 130, WiGig communication unit 301 and storage unit 304 may be independent from the other constituent elements, namely, two reception terminals 130 may be disposed separately.

Further, in the WiGig connection, setting information such as an ID and a password necessary for connection may be set every time of connection by using Wi-Fi.

Further, in the above exemplary embodiment, the WiGig communication can be performed only on a one-to-one basis, but the Wi-Fi communication may be also performed only on a one-to-one basis. Therefore, higher security can be ensured.

Further, in the above exemplary embodiment, data to be transmitted through WiGig is image data of monitoring camera 110, but may be data such as large-volume data and an analyzed result of that data which require ensuring of security.

Although Wi-Fi and WiGig are used, a radio having non-directivity such as a low-frequency radio of less than 10 GHz such as LTE or 3G may be used instead of Wi-Fi. A radio having directivity such as a radio of 10 GHz or more or an infrared ray may be used instead of WiGig.

Further, a plurality of antenna elements of a radio having directivity such as WiGig is provided, for example, and thus beam forming is performed. As a result, a radio having directivity may be used as a radio having non-directivity.

Further, the above exemplary embodiment has exemplified monitoring camera 110, but the present disclosure is applicable also to a case where data is acquired from a dashboard camera.

Since the above described exemplary embodiment is for exemplifying the technique of the present disclosure, various modifications, replacements, additions, and omissions can be made within the scope of the appended claims or of their equivalents.

The present disclosure is applicable to, for example, a system that can suppress interception of data by unauthorized users while maintaining convenience for user, and receives data of a monitoring camera.

What is claimed is:

1. A communication system comprising:
   a transmission terminal that transmits data; and
   a reception terminal that receives the data from the transmission terminal,
   wherein
   the transmission terminal includes
      a storage unit that stores the data and management information of the data, and
      a first communication unit that performs communication using a first radio method having non-directivity and a second radio method having directivity,
   the reception terminal includes
      a second communication unit that performs communication using the first radio method having non-directivity and the second radio method having directivity, and
      a selector that selects the data based on the management information, and
   the first communication unit and the second communication unit perform communication using the first radio method having non-directivity when selecting the data to be transmitted, and perform communication using the second radio method having directivity when transmitting the selected data.

2. The communication system according to claim 1, wherein the transmission terminal does not simultaneously communicate with a plurality of the reception terminals using the second radio method having directivity.

3. The communication system according to claim 1, wherein the first radio method having non-directivity and the second radio method having directivity are different radio methods from each other.

4. The communication system according to claim 1, wherein the first radio method having non-directivity performs communication by changing the directivity of the second radio method having directivity.

5. The communication system according to claim 1, wherein the transmission terminal notifies of a connection state of the second radio method having directivity using the first radio method having non-directivity.

6. The communication system according to claim 1, wherein the reception terminal notifies of information representing a receiving direction of the second radio method having directivity.

7. The communication system according to claim 1, wherein setting for the communication using the second radio method having directivity can be changed by using the first radio method having non-directivity.

8. A transmission terminal that transmits data to a reception terminal, the transmission terminal comprising:
   a storage unit that stores the data and management information of the data; and a communication unit that performs communication using a first radio method having non-directivity and a second radio method having directivity, wherein the communication unit performs communication using the first radio method having non-directivity when selecting the data to be transmitted, and performs communication using the second radio method having directivity when transmitting the selected data.

9. A reception terminal that receives data from a transmission terminal, the reception terminal comprising:

a communication unit that performs communication using a first radio method having non-directivity and a second radio method having directivity; and a selector that acquires management information of the transmission terminal, and selects the data based on the management information, wherein the communication unit performs communication using the first radio method having non-directivity when selecting the data to be received, and performs communication using the second radio method having directivity when receiving the selected data.

* * * * *